(12) United States Patent
Lee

(10) Patent No.: US 8,873,902 B2
(45) Date of Patent: Oct. 28, 2014

(54) OPTICAL TRANSMISSION MODULE AVOIDING SIGNAL LOSS

(75) Inventor: Bing-Heng Lee, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 71 days.

(21) Appl. No.: 13/600,225

(22) Filed: Aug. 31, 2012

(65) Prior Publication Data

US 2013/0294721 A1   Nov. 7, 2013

(30) Foreign Application Priority Data

May 4, 2012   (TW) .............................. 101116103 A

(51) Int. Cl.
*G02B 6/00* (2006.01)
*G02B 6/36* (2006.01)

(52) U.S. Cl.
USPC ............................................ 385/14; 385/147

(58) Field of Classification Search
CPC ........................................................ G02B 6/00
USPC .............................................. 385/14–16, 147
See application file for complete search history.

(56) References Cited

U.S. PATENT DOCUMENTS

| | | | | |
|---|---|---|---|---|
| 4,789,214 | A * | 12/1988 | Vilhelmsson et al. | 385/147 |
| 5,263,111 | A * | 11/1993 | Nurse et al. | 385/130 |
| 6,690,845 | B1 * | 2/2004 | Yoshimura et al. | 385/14 |
| 6,832,861 | B2 * | 12/2004 | Kragl | 385/88 |
| 7,062,144 | B2 * | 6/2006 | Hwang et al. | 385/139 |
| 7,136,551 | B2 * | 11/2006 | Cho et al. | 385/31 |
| 7,149,376 | B2 * | 12/2006 | Uchida et al. | 385/15 |
| 7,263,256 | B2 * | 8/2007 | Kim et al. | 385/32 |
| 7,541,058 | B2 * | 6/2009 | Chan et al. | 427/163.2 |
| 7,713,767 | B2 * | 5/2010 | Chan et al. | 438/24 |

* cited by examiner

*Primary Examiner* — Akm Enayet Ullah
(74) *Attorney, Agent, or Firm* — Novak Druce Connolly Bove + Quigg LLP

(57) ABSTRACT

An optical transmission module includes a printed circuit board (PCB) including a first surface and an opposite second surface, a ceramic substrate mounted on the first surface, a light emitting diode and a photodiode carried on the ceramic substrate, an optical printed circuit board (OPCB) mounted on the second surface, a first reflective unit and, and a second reflective unit. The OPCB includes a flexible substrate which carries a first planar optical wave guide corresponding the first reflective unit and a second planar optical wave guide corresponding the second reflective unit. The PCB defines a first through hole aligned with the light emitting diode and the first reflective unit and a second through hole aligned with the photodiode and the second reflective unit.

7 Claims, 2 Drawing Sheets

OPTICAL TRANSMISSION MODULE AVOIDING SIGNAL LOSS

BACKGROUND

1. Technical Field

The present disclosure relates to an optical transmission module.

2. Description of Related Art

As a flexible optical printed circuit board (FOPCB) can transmit more information than a traditional printed circuit board (PCB), the FOPCB is used to transmit information in electronic devices. The FOPCB is coupled with a light emitting diode and a photodiode for transmitting optical signals. The light emitting diode and the photodiode are mounted on a PCB and are higher than the PCB. The FOPCB are mounted on the PCB and must be bent to align with the light emitting diode and the photodiode and a percentage of signal loss occurs at the bent portion of the FOPCB.

Therefore, an optical transmission module which can overcome the above-mentioned problems is needed.

DETAILED DESCRIPTION

Figure 1:
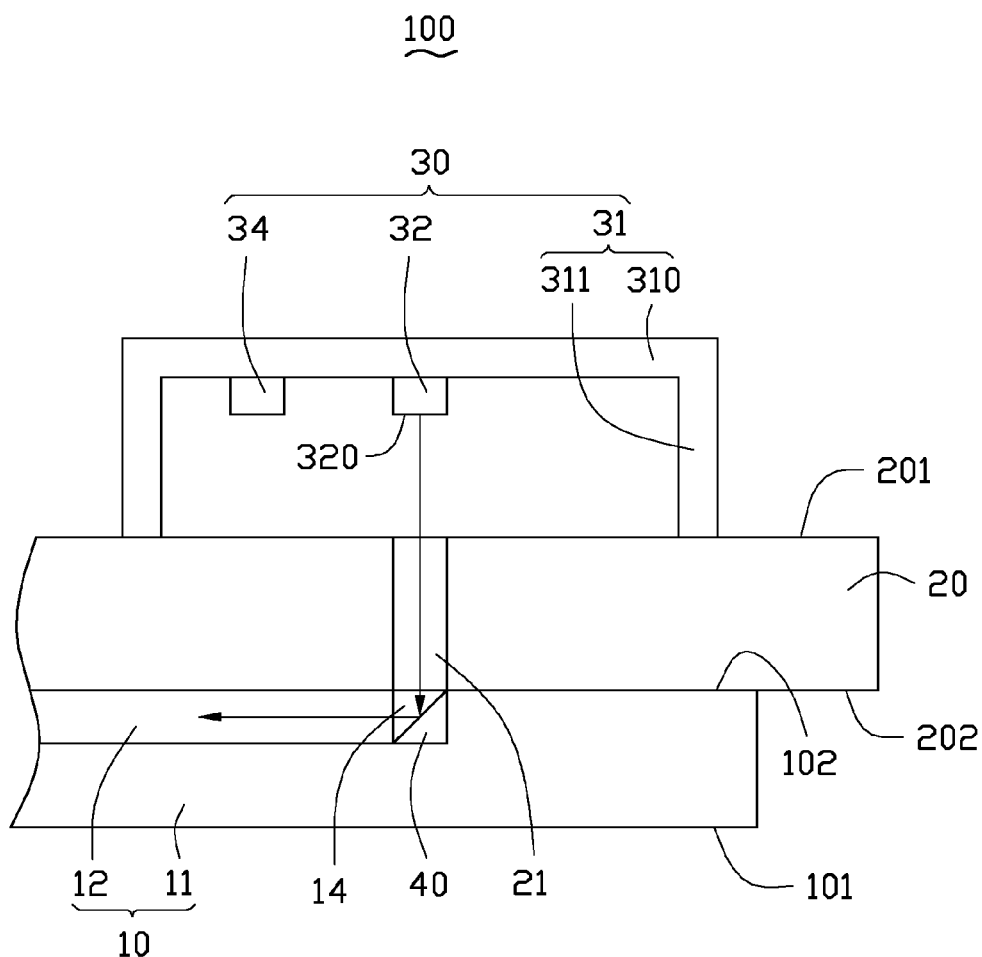
FIG. 1 is a schematic view of an optical transmission module according to an exemplary embodiment, showing a light emitting diode of the optical transmission module.
Figure 2:
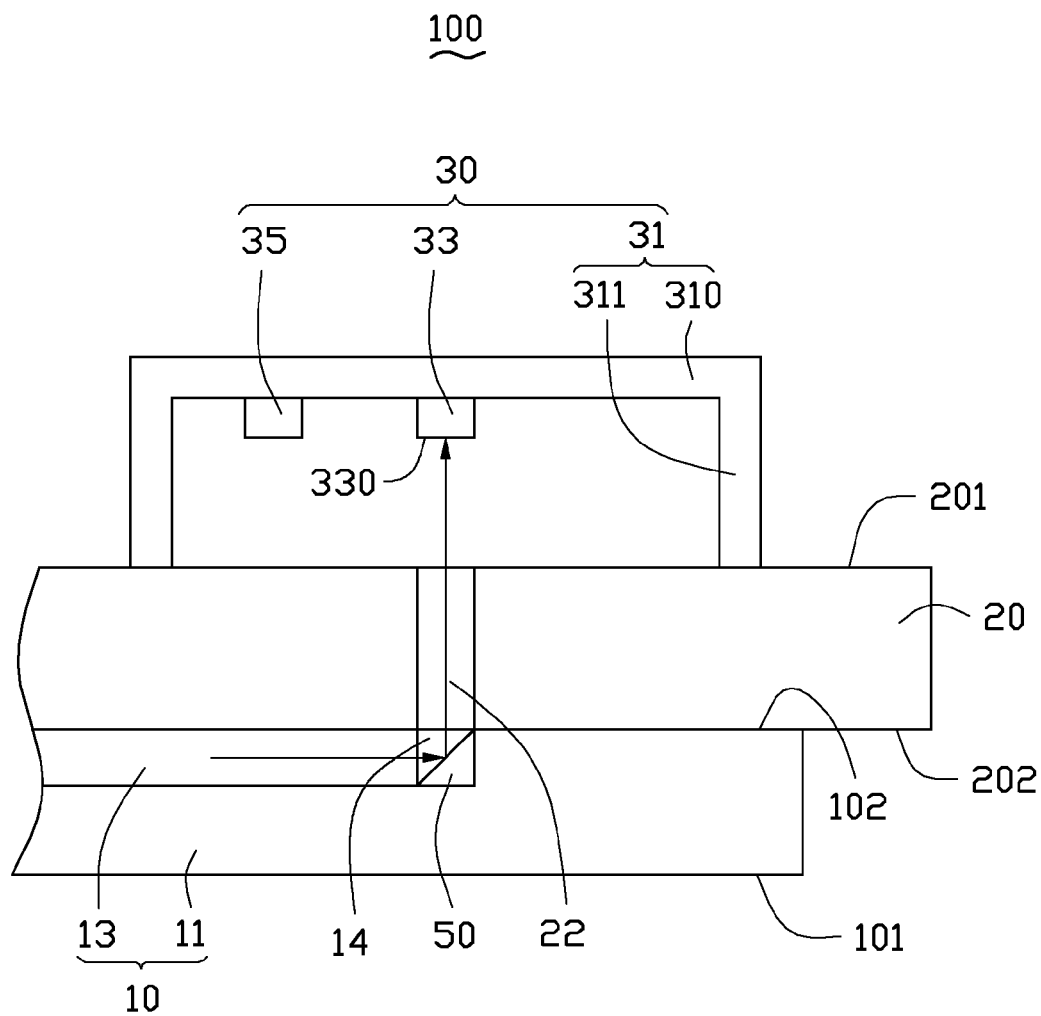
FIG. 2 is similar to FIG. 1, but showing a photodiode of the optical transmission module.

FIGS. 1 and 2 show an optical transmission module 100. The optical transmission module 100 includes an optical printed circuit board (OPCB) 10, a printed circuit board (PCB) 20, a photoelectric unit 30, a first reflective unit 40 and a second reflective unit 50.

The PCB 20 includes a first surface 201 and an opposite second surface 202. The second surface 202 is in contact with the OPCB 10. The PCB 20 defines a first through hole 21 and a second through hole 22 extending through the first surface 201 and the second surface 202.

The OPCB 10 includes a flexible substrate 11, a first planar optical wave guide 12 and a second planar optical wave guide 13. The first planar optical wave guide 12 and the second planar optical wave guide 13 are set on the flexible substrate 11. The flexible substrate 11 includes a third surface 101 and an opposite fourth surface 102. The fourth surface 102 is in contact with the PCB 20. The flexible substrate 11 defines a groove 14 in the fourth surface 102. The first reflective unit 40 and the second reflective unit 50 are set in the groove 14.

The first through hole 21 is aligned with the first reflective unit 40. The first reflective unit 40 spatially corresponds to the first planar optical wave guide 12. The second through hole 22 is aligned with the second reflective unit 50. The second reflective unit 50 spatially corresponds to the second planar optical wave guide 13.

The flexible substrate 11 is fixed on the second surface 202 of the PCB 20 by means of hot pressing process. The fourth surface 102 is in contact with the second surface 202. The first planar optical wave guide 12 and the second planar optical wave guide 13 are adjacent to the PCB 20.

The photoelectric unit 30 includes a ceramic substrate 31, a light emitting diode 32, a photodiode 33, a first chip 34, and a second chip 35. In this embodiment, the ceramic substrate 31 is a low temperature co-fired ceramic substrate. The light emitting diode 32 includes a light emitting surface 320. The photodiode 33 includes a light receiving surface 330. The first chip 34 is configured for driving the light emitting diode 32 to emit light. The second chip 35 is configured for receiving and processing electrical signals from the photodiode 33.

The ceramic substrate 31 includes a base plate 310 and a sidewall 311. The sidewall 311 is perpendicular to the base plate 310. The light emitting diode 32, the photodiode 33, the first chip 34 and the second chip 35 are set on the base plate 310. The light emitting surface 320 of the light emitting diode 32 and the light receiving surface 330 of the photodiode 33 are a distance away from the base plate 310.

The sidewall 311 is fixed on the first surface 201 of the PCB 20. The light emitting surface 320 of the light emitting diode 32 is aligned with the first through hole 21. The light receiving surface 330 of the photodiode 33 is aligned with the second through hole 22.

The first chip 34 drives the light emitting diode 32 to emit a first optical signal substantially perpendicular to the PCB 20. The first optical signal passes through the first through hole 21 and reaches the first reflective unit 40. The first reflective unit 40 reflects the first optical signal to a direction substantially parallel to the PCB 20, then the reflected first optical signal is coupled into the first planar optical wave guide 12 and is transmitted along the first planar optical wave guide 12.

A second optical signal transmitted along the second planar optical wave guide 13 is reflected by the second reflective unit 50 to a direction substantially perpendicular to the PCB 20. The reflected second optical signal passes through the second through hole 22 and reaches the photodiode 33. The photodiode 33 converts the second optical signal to an electrical signal and sends the electrical signal to the second chip 35 for processing.

As the PCB 20 defines the first through hole 21 and the second through hole 22 for transmitting optical signals, the OPCB 10 does not require to be bent to align with the light emitting diode 32 and the photodiode 33, thus any signal loss at the bent portion of the OPCB 10 is avoided.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An optical transmission module, comprising:
a printed circuit board (PCB) comprising a first surface and a second surface opposite to the first surface, the PCB defining a first through hole and a second through hole, both of the first and second through holes extending through the first surface and the second surface;
a ceramic substrate mounted on the first surface of the PCB;
a light emitting diode and a photodiode carried on the ceramic substrate, the light emitting diode comprising a light emitting surface aligned with the first through hole, the photodiode comprising a light receiving surface aligned with the second through hole;
an optical printed circuit board (OPCB) mounted on the second surface of the PCB, the OPCB comprising a flexible substrate, a first planar optical wave guide and a second planar optical wave guide mounted on the flexible substrate;

a first reflective unit mounted on the flexible substrate and aligned with the first through hole, wherein the light emitting diode is configured for emitting a first optical signal, the first optical signal passes through the first through hole and is reflected by the first reflective unit, and then is coupled into the first planar optical wave guide; and a second reflective unit mounted on the flexible substrate and aligned with the second through hole, wherein the second planar optical wave guide is configured for transmitting a second optical signal, the second optical signal is reflected by the second reflective unit and passes through the second through hole, then is received by the photodiode.

2. The optical transmission module of claim 1, wherein the ceramic substrate comprises a base plate and a sidewall perpendicular to the base plate, the light emitting diode and the photodiode are mounted on the base plate, and the sidewall is fixed on the PCB.

3. The optical transmission module of claim 1, wherein the ceramic substrate is a low temperature co-fired ceramic substrate.

4. The optical transmission module of claim 1, wherein the flexible substrate defines a groove, and the groove receives the first reflective unit and the second reflective unit therein.

5. The optical transmission module of claim 1, further comprising a first chip mounted on the ceramic substrate, and the first chip configured for driving the light emitting diode to emit the first optical signal.

6. The optical transmission module of claim 1, further comprising a second chip mounted on the ceramic substrate, the photodiode configured for converting the second optical signal into an electrical signal, and the second chip configured for receiving and processing the electrical signal.

7. The optical transmission module of claim 1, wherein the flexible substrate is fixed to the PCB by hot pressing process.

* * * * *